US007783928B2

(12) United States Patent
Abrashkevich et al.

(10) Patent No.: US 7,783,928 B2
(45) Date of Patent: Aug. 24, 2010

(54) DESCRIPTION OF ACTIVITIES IN SOFTWARE PRODUCTS

(75) Inventors: Alexander Abrashkevich, Richmond Hill (CA); Dmitri Abrashkevich, Richmond Hill (CA); Ralph James Bateman, Horton Heath (GB); Stephen Rees, Bowmanville (CA); Yinghua (Amy) Tang, Scarborough (CA); Robin D. Grosman, Markham (CA); Mark Francis Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/849,142

(22) Filed: Aug. 31, 2007

(65) Prior Publication Data
US 2009/0063904 A1 Mar. 5, 2009

(51) Int. Cl.
G06F 11/00 (2006.01)
(52) U.S. Cl. .............................. 714/38; 714/45; 714/46
(58) Field of Classification Search .................. 714/25, 714/26, 27, 38, 39, 45, 46, 48, 49, 51
See application file for complete search history.

(56) References Cited

U.S. PATENT DOCUMENTS

| 6,721,941 | B1 * | 4/2004 | Morshed et al. | 714/38 |
| 7,231,550 | B1 * | 6/2007 | McGuire et al. | 714/26 |
| 7,454,665 | B2 * | 11/2008 | Menadue | 714/45 |
| 2005/0273667 | A1 * | 12/2005 | Shrivastava et al. | 714/38 |
| 2006/0085690 | A1 * | 4/2006 | Bolen et al. | 714/39 |
| 2007/0174731 | A1 * | 7/2007 | Haeberle et al. | 714/46 |
| 2008/0126828 | A1 * | 5/2008 | Girouard et al. | 714/45 |

OTHER PUBLICATIONS

Miller, Brent A., et al., "The Common Base Event V1.0.1: User's Guide," International Business Machines Corporation, copyright 2002, 65 pages.

* cited by examiner

Primary Examiner—Robert Beausoliel
Assistant Examiner—Joseph D Manoskey
(74) Attorney, Agent, or Firm—Sawyer Law Group, P.C.

(57) ABSTRACT

A method for describing activities in software products is provided. The method provides for identifying a plurality of activities in a software product that are of interest, defining an event structure to describe each identified activity as an event, associating each identified activity with one or more problem determination technologies, executing the software product, and responsive to detecting one of the plurality of identified activities during execution of the software product, creating one or more event records for the one detected activity based on the defined event structure, initiating the one or more problem determination technologies associated with the one detected activity, and passing the one or more event records to each of the one or more problem determination technologies.

5 Claims, 3 Drawing Sheets

DESCRIPTION OF ACTIVITIES IN SOFTWARE PRODUCTS

FIELD OF THE INVENTION

The present invention relates generally to description of activities in software products.

BACKGROUND OF THE INVENTION

When problems occur in a software product, information that describes what is happening inside the software product is not typically available. This makes it very difficult to diagnose and resolve the problems that occur in the software product. Even when information is available, for instance, in the form of log or trace records, the information is usually only human readable. This is problematic because the amount of information that needs to be analyzed could be such that it would not be possible for a person to quickly find what is causing the problems in the software product. Consequently, the person may need to use other software products to filter the information in order to find causes for the problems quickly. This would require the information to be both human and machine readable.

SUMMARY OF THE INVENTION

A method for describing activities in software products is provided. The method provides for identifying a plurality of activities in a software product that are of interest, defining an event structure to describe each identified activity as an event, associating each identified activity with one or more problem determination technologies, executing the software product, and responsive to detecting one of the plurality of identified activities during execution of the software product, creating one or more event records for the one detected activity based on the defined event structure, initiating the one or more problem determination technologies associated with the one detected activity, and passing the one or more event records to each of the one or more problem determination technologies.

DETAILED DESCRIPTION

Figure 1:
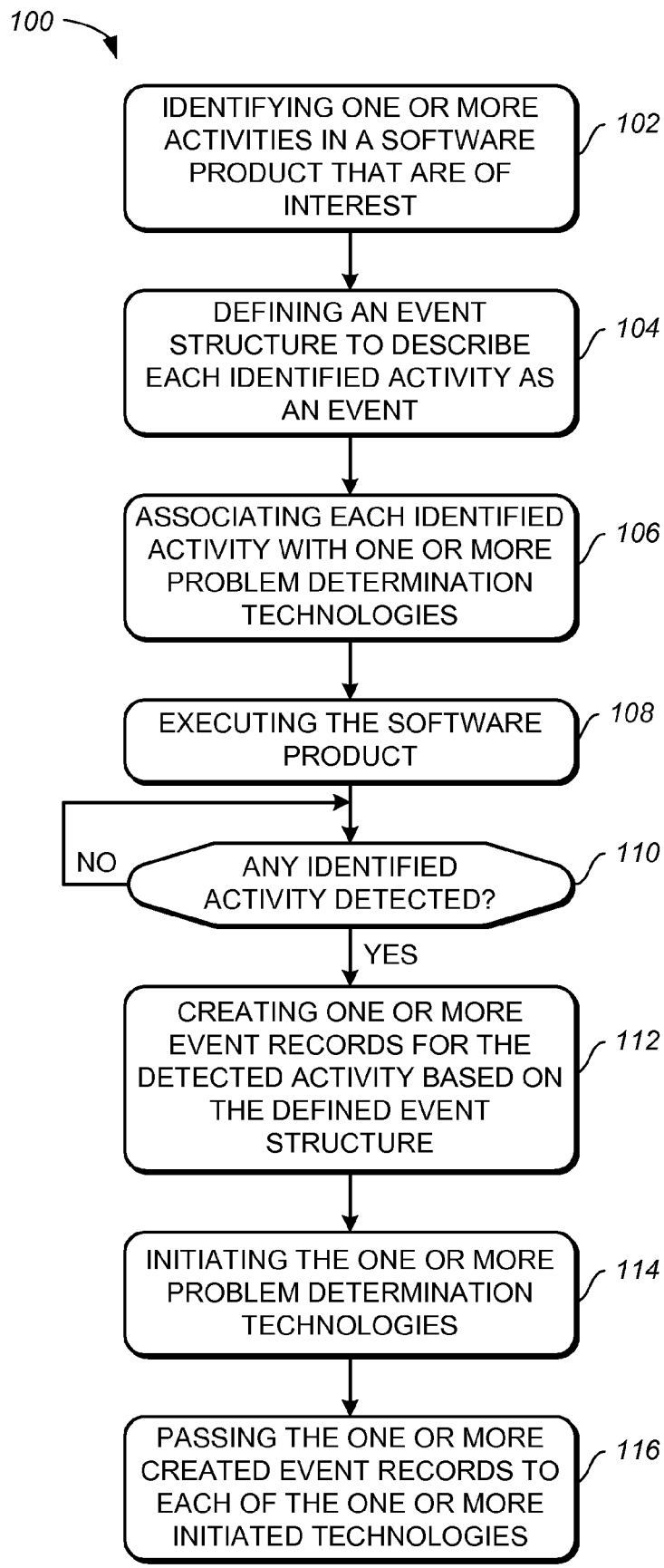
FIG. 1 depicts a process for describing activities in software products according to an implementation of the invention.

The present invention generally relates to description of activities in software products. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

Information regarding what is happening inside software products is typically not available. For example, information regarding a current state or progress of a software product, a history of activities in the software product, an amount of time the software product spends on various activities, and so forth, is not readily available. This makes it difficult to diagnose and resolve problems that occur in software products, such as bottlenecks, error conditions, hangs, and so forth.

Finding solutions to problems in software products is further complicated by the fact that the problems may be due to external factors, such as issues with a network, another system, and so forth. If information regarding what is happening inside a software product is not readily available, then it will be difficult to determine whether a problem with the software product is caused by the software product itself or something else.

As an example, assume the software product is an email application and the problem with the email application is that it stalls when receiving emails. The email application may be stalling as a result of internal factors, such as an email filtering process in the email application hanging. However, the email application may be stalling as a result of external factors, such as a network connection failing. Without information regarding what was happening in the email application when the problem occurred (e.g., was the email application trying to read from a network, was the email application trying to filter an email, and so forth), it will be difficult to determine what caused the problem.

Information regarding a software product is sometimes provided, for instance, in the form of log or trace records, error messages, and so forth. These forms of information, however, are only human readable. This is problematic because the amount of information may be significant, such as gigabytes of data. Since a person may not able to analyze the information quickly enough to diagnose and resolve problems in the software product, other software products (e.g., tools, applications, programs, and so forth) may be needed to assist the person to analyze the information in a shorter amount of time. Hence, the information will need to be both human and machine readable.

Information that is provided in the form of log or trace records, error messages, and so forth usually gives no indication of when an activity in the software product started or stopped. If the software product is used worldwide, these forms of information may also need to be translated into multiple languages so that users in countries across the world can understand the information.

Additionally, information that is provided in the form of log or trace records, error messages, and so forth may be difficult for end users to understand. For example, function names, line numbers and other means of identifying code location are intended for a technical audience, not business users. This is problematic since business users have the greatest business need to know what happened or what is happening.

Information that is provided in the form of log or trace records, error messages, and so forth usually does not provide a good understanding of the scope and context of the problem. Stack traces can be used to provide technical context, but these are not readily understandable to users of the software and again are typically meant for a support or development audience.

Logs, traces, stack traces, activity statistics, performance indicators, and other facilities are also poorly integrated. For example, a user investigating a problem should have a sense of continuity moving from one type of diagnostic information to another. A user should be able to compress a trace and see similar statistics to that of the live statistics facility. A stack trace captured in a trace or log facility should contain the same information to that of a stack trace dumped as needed.

Stack traces currently do not contain information about time spent at each layer and also typically do not contain information about referenced objects and other important information used at each layer. Further, the architecture of software is difficult to understand and to document since it changes frequently. A well described trace of the activities should define the architecture and be easily tied to an architecture manual.

Depicted in FIG. 1 is a process 100 for describing activities in software products according to an implementation of the invention. At 102, a plurality of activities that are of interest in a software product (e.g., activities that are typically involved in problems that arise in the software product) is identified. The plurality of identified activities is a subset of all possible activities in the software product. Typically, these activities will define how the product works and should ideally be understandable by a business user, not just a very technical audience.

Activities in the software product may be higher level activities, such as retrieving email, sending email, and so forth, which are understandable by an ordinary user. Activities in the software product may also be lower level activities, such as connecting to email server, communicating to SMTP protocol, sending data, closing connection, and so forth, which may or may not be understandable by the ordinary user. Thus, each activity may include one or more actions (e.g., connecting to email server) depending on its level.

Identifying activities that are of interest from all possible activities may seem daunting at first, especially with large, enterprise software products, such as Lotus Notes and DB2 from International Business Machines Corporation of Armonk, N.Y. However, in any software product, there are usually only a few hundred activities that may be of interest. These activities will describe how the product works.

At 104, an event structure to describe each identified activity as an event is defined. In one implementation, the defined event structure is a 64-bit binary variable. The 64-bit binary variable is lightweight, compact, and easily implemented. In addition, the 64-bit binary variable saves space, which satisfies space constraints, and minimizes time spent on performing read/write operations, which satisfies fast access constraints.

Set forth below is a standardized event schema according to an implementation of the invention. The defined event structure may be based on the standardized event schema.

EVENT TYPE: a verb describing an action of an event (e.g., startup, send, receive, dispatch, read, write, report, and so forth)

EVENT OBJECT ID: a type of an object on which an action is performed (e.g., agent, table, thread, process, logger, statement, and so forth).

EVENT OBJECT: a name of an object on which an action is performed (e.g., "table name", "thread name", "process name", "logger name", and so forth)

EVENT STATE: a state or progress of an event (e.g., success, failure, start, stop, in progress, % of progress, and so forth)

EVENT QUALIFIER: something that qualifies or modifies an action (e.g., "sender name", "receiver name", "from", "to", "for", and so forth)

EVENT ATTRIBUTES: attributes of an action (e.g., business level, dynamic, automatic, cached, logical, physical, direct, internal, external, and so forth)

EVENT IMPACT: an impact of an event on a software product (e.g., critical, immediate, potential, unlikely, none, and so forth)

In another implementation, the defined event structure may be a larger or smaller binary variable (e.g., 32-bit, 128-bit, and so forth). Additionally, rather than using a single 64-bit binary variable as the defined event structure, multiple 64-bit binary variables may be used instead. Further, the defined event structure need not be a binary variable at all. For instance, the defined event structure may be implemented as text.

Figure 2:
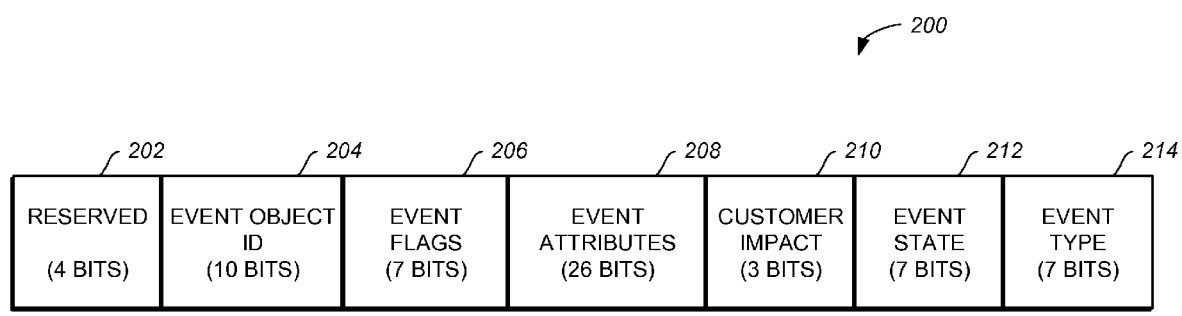
FIG. 2 illustrates an event structure for describing activities in software products according to an implementation of the invention.

FIG. 2 illustrates an event structure 200 for describing activities in software products according to an implementation of the invention. Event structure 200 includes a "Reserved" field 202 of 4 bits, an "Event Object ID" field 204 of 10 bits, an "Event Flags" field 206 of 7 bits, an "Event Attributes" field 208 of 26 bits, a "Customer Impact" field 210 of 3 bits, an "Event State" field of 7 bits, and an "Event Type" field of 7 bits.

In other implementations, different combination of fields may be included in event structure 200. For instance, event structure 200 may not include "Reserved" field 202 and instead include an "Event Object" field (not shown). Additionally, the size of each field (i.e., number of bits) in event structure 200 may be different. For instance, "Event Flags" field 206 may be 9 bits instead of 7 and "Event Attributes" field 208 may be 10 bits instead of 26.

Some of the fields in event structure 200 are not included in the implementation of the standardized event schema set forth above. In particular, "Event Flags" field 206 and "Customer Impact" field 210 are not defined in the implementation of the standardized event schema set forth above. "Event Flags" field 206 may be used to manipulate an event (e.g., exclude a type of event, indicate a facility tied to the event, and so forth). "Customer Impact" field 210 may be used to indicate an impact of an event on a user rather than just on a software product. These fields may be included in other implementations of the standardized event schema.

Likewise, some of the definitions in the standardized event schema are not included in event structure 200. For instance, "Event Object" and "Event Qualifier", which are defined in the standardized event schema, are not fields in event structure 200 because not all activities may involve an "Event Object" or an "Event Qualifier". Data relating to "Event Object" and "Event Qualifier" may be attached as optional data to event structure 200.

As an example, "from" and "to" event qualifiers to specify previous and new values may be attached to a description of a "change configuration" activity that is based on event structure 200. Similarly, "from" and "to" event qualifiers may be attached to a description of a "send" or "receive" activity that is based on event structure 200. Activities such as "startup", "report", "interrupt", and so forth, usually do not have event qualifiers.

Event objects and data associated with an event can be specified using a standard 3-tuple description, which includes type of data (e.g., integer, string, and so forth), size of data, and pointer to data. Event qualifiers may be implemented as 4-tuple descriptions, where an additional tuple is included to indicate that the associated data is an event qualifier. Since event descriptions based on the defined event structure is machine readable, other software products can be used to filter desired events based on, for instance, event type, event state, object type, event attribute, and so forth.

Referring back to FIG. 1, at 106, each identified activity is associated with one or more problem determination technologies. Identified activities may be associated with problem determination technologies by placing event points at specific locations in the software product code corresponding to the identified activities and associating the event points with particular problem determination technologies. An event point may be placed where one or more actions of an activity are located.

The one or more problem determination technologies may be technologies that are part of the software product (e.g., log/trace facility). In one implementation, the one or more associated problem determination technologies includes one or more of a log facility, a trace facility, an event stack, an event recorder, an event statistics collector, an event trigger, and an event monitor.

A log facility is used for writing diagnostic messages (critical errors, errors, warnings, informational records, and the like) during execution of a software program into a log file. The log file may contain information needed for problem determination, correlation of events (actions), user identification, changes to the software product (e.g., configuration changes), and so forth. The amount of logging is regulated by setting a logging level at which messages are logged.

A trace facility traces the execution of a software program (usually for debugging purposes). Typically, control flow information, such as function entry points and function exit points, code path, start/end of events, and data points, are recorded. Trace records may contain additional information needed to identify potential problems. In order to leave any amount of trace on, the overhead needs to be low. Hence, tracing is usually done into a memory buffer in shared or private memory (e.g., formatted records could be dumped into a file when needed). Trace records, however, may be directly stored into a file, but will result in a significantly higher overhead. Tracing and logging are closely related and provide a historical record of errors and events. Logging is always on at some logging level while trace is mostly used when a problem can be reproduced although in some situations it can be enabled during run-time.

An event stack and an event recorder can be used to describe a current state or progress of a software product, as well as, a history of most recent activities in the software product. An event stack may be used to track all significant high-level activities happening in a software product in a hierarchical manner. Event stack is useful for activities that have duration (e.g., activities with more than one action or that may take enough time to be noticeable by an end user).

Strict chronological order of events (e.g., event hierarchy) is enforced when events are stored on a stack. In one implementation, an event (e.g., a description of the event using the defined event structure) is pushed on a stack when it starts and is popped from the stack when it ends. Hence, if key activities of a software product have been selected and associated with an event stack, then at any given moment, the event stack will represent a current state (e.g., activity snapshot) of the software product.

Event stack can be implemented as an array based stack where each element in the stack contains an instance of the defined event structure, as well as one or more of an event object, a function name, a probe number (e.g., line of code), a time sequence (e.g., timestamp), and other data. Function name and probe number for the purpose of linking the functional information to the source code. Events may be pushed to and popped from an event stack in a strict chronological order. A counter can be used for tracking stack overflows. In one implementation, the data or state of an element on an event stack is updated in place during runtime, which provides flexibility for dynamically changing state/content of events. At any time, the event stack can be dumped giving a clear, human and machine readable view of the current activity for a thread or process.

An event recorder can be used to record most recent events. Events stored in an event recorder can have duration or simply be a point in time (e.g., a single action). Strict chronological order of events is not required for an event recorder. Events can be stored into an event recorder in any order and at any level (e.g., high, medium, low, and so forth). Thus, an event recorder may describe a history (e.g., flow) of most recent events in a software product. In one implementation, an amount of time in which an event recorder is in operation is limited to preserve space.

Event recorder may be implemented using a circular array so that the most recent events can be recorded. Chronological order constraints need not be imposed. The content of elements in an event record may be similar to the content of elements in an event stack. An event recorder may be wrapped up (e.g., closed) when it becomes full. Using timestamps, counters, or the like, events from an event recorder can be matched with events from an event stack. Timestamps recorded in an event stack and the event recorder can provide time sequence information needed to identify where a software product spends time on in order to tackle performance problems.

With an event stack and an event recorder, a user can have a current state or activity snapshot of a software product at any given point, as well as a historical picture of most recent events that have occurred in the software product. Event stacks and recorders may be stored in a thread specific storage, which may be in shared or private memory.

An event statistics collector can be used in conjunction with one or more other problem determination technologies to assist in monitoring a current product state and resolving various performance problems and bottlenecks. A single activity/event can have many different types of statistics. Statistics that may be collected include:

Numeric counters (e.g., accumulator, number of changes counter, and so forth)

Timer (e.g., high water mark to signify maximum time spent on an event, low water mark to signify minimum time spent on the event, accumulator to signify total time spent on the event, number of occurrences counter to calculate average time, and so forth)

Gauge (e.g., current, high water mark to indicate highest gauge value, low water mark to indicate lowest gauge value, maximum to indicate a boundary that cannot be exceeded, and so forth)

An event trigger can be activated at an event in order to perform a specific action or prevent performance of a specific action. For example, gathering statistics could be an expensive operation, thus an event statistics collector may only be set to initiate at some particular event points. As another example, using an event trigger, a trace facility can be turned on when an action begins and turned off when the action ends.

An event monitor may be used to monitor specific activities of a software product. For example, an event monitor may monitor memory or disk usage when a particular activity takes place in the software product. In addition, an event monitor may be configured to send a message, display a notification, or the like when a threshold value is reached.

In one implementation, one or more problem determination technologies are combined into a combination technology. Hence, rather than associating multiple problem determination technologies to an identified activity, a single combination technology may be associated with the identified activity. This will simplify association of activities to problem determination technologies.

Referring back to FIG. 1, the software product is executed at 108. A determination is then made at 110 as to whether one of the identified activities has been detected. If no identified activity has been detected, process 100 loops back to 110. Otherwise, one or more event records are created for the one detected activity at 112. One or more event records may be created for the one detected activity because the one detected activity may include more than one action. Even though the one detected activity may include more than one action, an event record need not be created for each action in the one detected activity. In one implementation, each event record has the defined event structure, which is machine and human readable with little or no translation.

The one or more problem determination technologies associated with the one detected activity are initiated at 114. At 116, the one or more event records created for the one detected activity detected are passed to each of the one or more problem determination technologies associated with the one detected activity. Although not shown, during execution of the software product, one or more additional problem determination technologies may be associated with the one detected activity. In addition, at least one of the one or more problem determination technologies associated with the one detected activity may be disassociated during execution of the software product.

In one implementation, the one or more event records created for the one detected activity are incorporated into information outputted by at least one of the one or more problem determination technologies associated with the one detected activity. Below is an example of information that is outputted by a log facility in relation to an event:

```
2005-12-11-23.50.59.834454-300 I91694A270        LEVEL    : Event
PID         : 4481174      TID    : 1            PROC     : db2sysc
INSTANCE    : aabrashk     NODE   : 000
FUNCTION    : DB2 UDB, base sys utilities, DB2StopMain, probe:2618
CREATE      : Table : "staff" : Progress (75%) : [business level]
IMPACT      : Critical
```

As seen from above, data from an event record, such as "Progress" and "Impact", has been incorporated into the information outputted by the log facility. Below is an example of information that is outputted by a trace facility in relation to an event:

```
event DB2 UDB data protection services sqlpgild fnc (15.3.16.31.0.3069)
pid 8888574 tid 1 cpid −1 node 0 sec 0 nsec 11315 probe 3069
bytes 76
Event: PD_EVENT_TYPE_CHANGECFG
Customer Impact: Critical
Description: "Change configuration event"
Object ID: PD_EVENT_ID_CFG Description: "Configuration"
CHANGECFG : CFG : DB2SET "CODEPAGE" : FROM "943" :
TO "831" : success : [permanent]
```

As with the previous example, data from an event record has been incorporated into the information outputted by the trace facility. In the example, information relating to "Event", "Object ID", and so forth are outputted along with tracing information from the trace facility. Below is an example of information that is outputted by an event statistics collector in relation to an event:

```
          EVENT: WRITE: PAGE
               COUNT      : 32
               MINTIME    : 0.0234
               MAXTIME    : 0.5234
               AVETIME    : 0.1645
```

The above example includes statistics for a "write" event. In the example, the statistics may have been gathered by increasing a counter and recording time information when an event point is hit. Various statistics information (e.g., maximum, minimum, average time, and so forth) can then be retrieved or calculated.

Below is a sample output of an event stack containing two events with some data attached. In the example, the maximum stack depth has been set to 64 elements. Larger event stacks, however, can be used. The time output in the example below is in microseconds format. Additionally, the latest (e.g., most current) event is on top of the event stack.

```
========================================================
        Event Stack: Maximum stack depth is 64 elements
              Total number of events on stack is 2
              The latest event (on top of stack) is #2
        Time is output using the seconds.microseconds format
========================================================
========================================================
        Summary of events on stack: event # - event header - event duration
========================================================
Event #2 - CHANGECFG : CFG : DBM : success : [ business level |
async ] - 3.049330 Event #1 - CREATE : TABLE : aabrashk.foo :
in progress : [ business level ]
- 3.049351
========================================================
        Detailed description of DB2 events and related data
========================================================
=== Event #2 ===
Event: PD_EVENT_TYPE_CHANGECFG - "Change configuration
event"
Customer Impact: Potential
Object ID: PD_EVENT_ID_CFG - "Configuration"
Function: DB2 UDB, base sys utilities, sqeLocalDatabase::FirstConnect,
probe: 3248
CHANGECFG : CFG : DBM : success : [ business level | async ]
Data #1:
(PD_TYPE_STRING,19) String:
Data integrity test
Data #2: (PD_TYPE_HEXDUMP,22) Hexdump:
7064 2074 6573 7420 6765 6E65 7269 6320    pd test generic
7374 7269 6E67                             string
Event Duration: 3.049330
=== Event #1 ===
Event: PD_EVENT_TYPE_CREATE - "Create event"
Customer Impact: Critical
Object ID: PD_EVENT_ID_TABLE - "Table"
Function: DB2 UDB, base sys utilities, sqeLocalDatabase::FirstConnect,
probe: 3270
CREATE : TABLE : aabrashk.foo : in progress : [ business level ]
Data #1:
(PD_TYPE_STRING,19) String:
Data integrity test
Event Duration: 3.049351
```

Below is a fragment of a sample formatted event recorder output displaying the first three records of out 256 records stored in a circular array with 256 elements. Other event recorders may have more or less elements.

```
========================================================
        Event Recorder: Total # of elements in circular array is 256
              The last sequence number recorded is 267
        Time is calculated since the Epoch (00:00:00 UTC, January 1,
        1970) and output using the seconds.microseconds format
========================================================
=== Record #1 (Slot #245) ===
Event: DISPATCH - "Dispatch event"
Customer Impact: Immediate
Object ID: DB2AGENT - "DB2 agent"
Function: DB2 UDB, base sys utilities, sqeLocalDatabase::FirstConnect,
probe: 10
DISPATCH : DB2AGENT : Object is NULL : progress (54%) :
[ internal | async ]
Time: 1174418814.536964
```

-continued

```
=== Record #2 (Slot #246) ===
Event: CREATE - "Create event"
Customer Impact: Immediate
Object ID: TABLE - "Table"
Function: DB2 UDB, base sys utilities, sqeLocalDatabase::FirstConnect,
probe: 246
CREATE : TABLE : aabrashk.foo : success : [ business level | sync ]
Time: 1174418814.537052
=== Record #3 (Slot #247) ===
Event: CREATE - "Create event"
Customer Impact: Immediate
Object ID: TABLE - "Table"
Function: DB2 UDB, base sys utilities, sqeLocalDatabase::FirstConnect,
probe: 258
CREATE : TABLE : Hexdump : success : [ business level ]
OBJECT: (PD_TYPE_HEXDUMP,12) Hexdump:
6161 6272 6173 686B 2E66 6F6F                    aabrashk.foo
Time: 1174418814.537061
```

By standardizing the description of activities in software products, various problem determination technologies (e.g., tracing, logging, statistics, and so forth) can be linked. In addition, machine and human readable contexts are provided for activities in software products that can be used by other software products and humans to resolve problems and determine status/progress of current/recent activities in the software products.

Other software products can be used to do ground work for service analysts and developers as information produced by different problem determination technologies are linked, correlated, sorted, processed, filtered, and so forth to re-create a picture of what was going on with a software product since the information produced by the different problem determination technologies will all include event descriptions based on the defined event structure.

Strategically placed event points can also be used to restore recent activities in a software product from recorded events. At the same time, humans (e.g., customers, service analysts, developers, and so forth) will be able to easily recognize and correlate standard events obtained from different sources and stored in various locations to use as context for identifying problems, resolving performance issues, and so forth.

Activities can now be identified with standardized verb and object, which greatly reduces the need for NLS (National Language Support) and makes activities machine readable. In addition, activities can be further described through attributes. Hence, event descriptions can include very detailed information and still be human and machine readable.

Languages, such as SQL (Structured Query Language), can now be used to filter and mine events. Runtime selection of which events to trigger and which problem determination technologies are triggered with each event is now possible. The ability to drill down using trigger points is also provided. Further, the above techniques are equally applicable to software solutions.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 3:
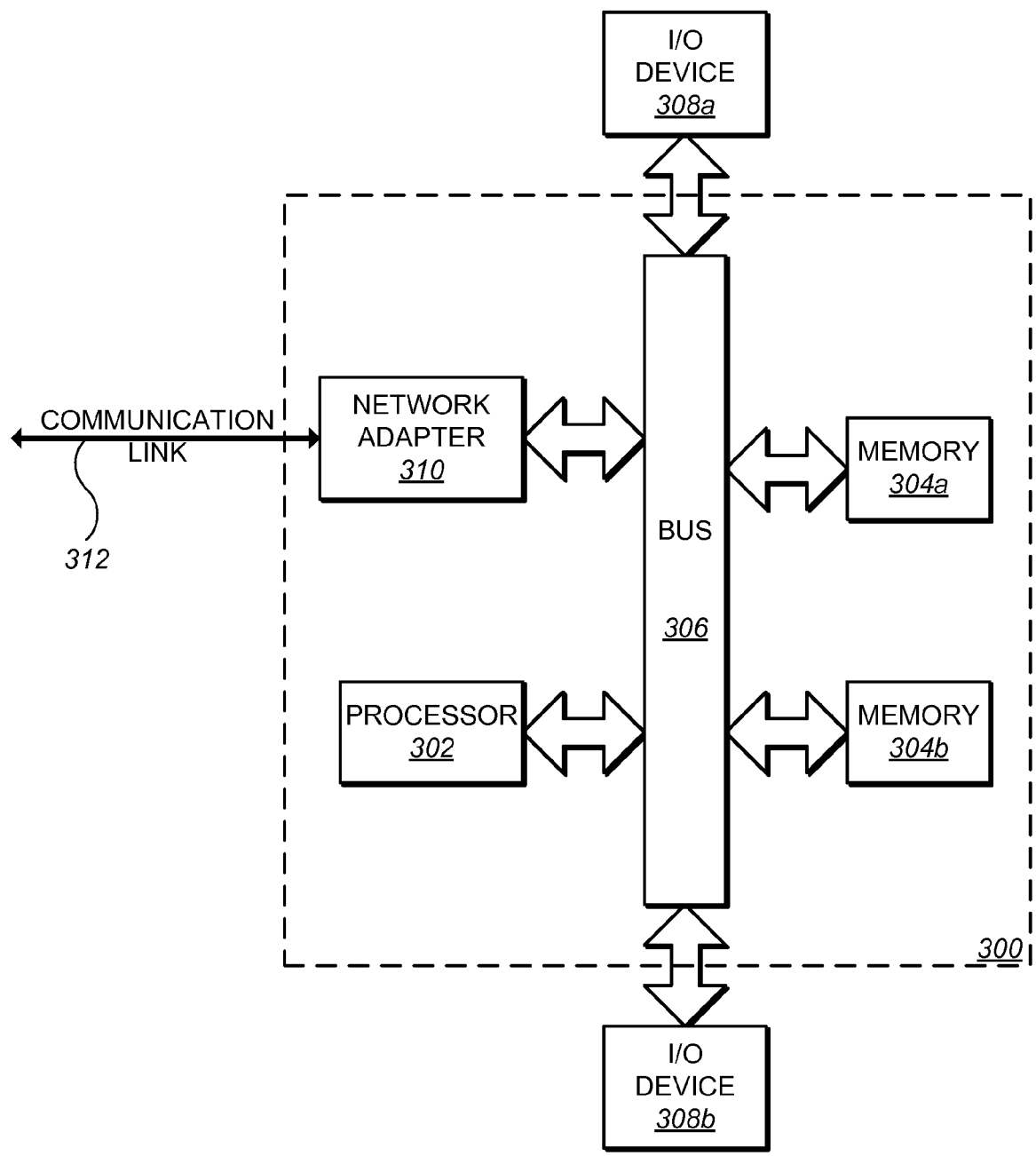
FIG. 3 shows a block diagram of a data processing system with which implementations of the invention can be implemented.

FIG. 3 depicts a data processing system 300 suitable for storing and/or executing program code. Data processing system 300 includes a processor 302 coupled to memory elements 304a-b through a system bus 306. In other implementations, data processing system 300 may include more than one processor and each processor may be coupled directly or indirectly to one or more memory elements through a system bus.

Memory elements 304a-b can include local memory employed during actual execution of the program code, bulk storage, and cache memories that provide temporary storage of at least some program code in order to reduce the number of times the code must be retrieved from bulk storage during execution. As shown, input/output or I/O devices 308a-b (including, but not limited to, keyboards, displays, pointing devices, etc.) are coupled to data processing system 300. I/O devices 308a-b may be coupled to data processing system 300 directly or indirectly through intervening I/O controllers (not shown).

In the implementation, a network adapter 310 is coupled to data processing system 300 to enable data processing system 300 to become coupled to other data processing systems or remote printers or storage devices through communication link 312. Communication link 312 can be a private or public network. Modems, cable modems, and Ethernet cards are just a few of the currently available types of network adapters.

While various implementations for describing activities in software products have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method for describing activities in software products, the method comprising:
   identifying a plurality of activities in a software product that are of interest, the plurality of identified activities being a subset of all possible activities in the software product;
   defining an event structure to describe each identified activity as an event, wherein the defined event structure comprises a 10-bit object identifier field, a 7-bit event flags field, a 26-bit event attributes field, a 3-bit customer impact field, a 7-bit event state field, and a 7-bit event type field;

associating each identified activity with one or more problem determination technologies, the one or more problem determination technologies including one or more of a log facility, a trace facility, an event stack, an event recorder, an event statistics collector, an event trigger, and an event monitor;

executing the software product; and responsive to detecting one of the plurality of identified activities during execution of the software product, creating one or more event records for the one detected activity, each event record having the defined event structure and being machine readable and human readable, initiating the one or more problem determination technologies associated with the one detected activity, and passing the one or more event records to each of the one or more problem determination technologies.

2. The method of claim 1, wherein the defined event structure is a 64-bit binary variable.

3. The method of claim 1, wherein response to detecting one of the plurality of identified activities during execution of the software product, the method further comprises:

associating one or more additional problem determination technologies with the one detected activity.

4. The method of claim 1, wherein responsive to detecting one of the plurality of identified activities during execution of the software product, the method further comprises:

disassociating at least one of the one or more problem determination technologies associated with one detected activity.

5. The method of claim 1, wherein each identified activity is associated with a single problem determination technology, the single problem determination technology includes a log facility, a trace facility, an event stack, an event recorder, an event statistics collector, an event trigger, and an event monitor.

\* \* \* \* \*